UNITED STATES PATENT OFFICE.

ALBERT DILLON DE MICHEROUX, OF MARSEILLES, FRANCE.

PROCESS OF MANUFACTURING ARTIFICIAL-FUEL BLOCKS.

SPECIFICATION forming part of Letters Patent No. 711,995, dated October 28, 1902.

Application filed June 14, 1899. Serial No. 720,579. (No specimens.)

*To all whom it may concern:*

Be it known that I, ALBERT DILLON DE MICHEROUX, a citizen of the Republic of France, residing at Marseilles, France, have invented certain new and useful Improvements in Processes for Manufacturing Artificial-Fuel Blocks, of which the following is a specification.

My invention relates to the manufacture of artificial fuel in the form of blocks, the object being to provide an economical process of making such fuel which will possess greater heating power and cause less smoke during combustion than the like products heretofore produced.

My improved process is designed to utilize the residues of various kinds of hard or soft coal and permits the utilization of mineral powder or dust without mixing it with other fuel for the purpose of submitting it to the action of a blast-furnace.

In carrying out my invention I prepare a mixture of liquid hydrocarbons, such as petroleum-oil, and preferably gas-tar, alkaline substances, such as lime or sodaic lime, (a compound of lime and caustic soda,) and organic acids in the form of fatty animal or vegetable matters or resins, the mixture being submitted to heat and continuous agitation. The gas-tar, which represents eighty per cent. of the mixture, is first submitted to a partial distillation to relieve it of ammoniacal waters and light oils, which are collected and condensed. The sodaic lime in the state of a sticky cold paste is submitted to the action of an air-current freed of its carbonic gas and electrified by means of discharges and sparks produced by any well-known devices or apparatus, which form no part of this invention. When the air thus treated has acted sufficiently on the lime-soda compound, the latter is mixed with a resin in a finely-comminuted condition. The sodaic lime and the resin, which together represent twenty per cent. of the admixture, are then added to the tar and the whole subjected to heat until a temperature of 100° centigrade is reached, the mixture being constantly stirred or agitated, thus converting the water and a portion of the oils contained in the sodaic lime into steam, said oils being afterward collected by condensation. After heating the mixture for several hours it is left to cool, and when sufficiently cold it is placed in a kneading or other like apparatus, where it is thoroughly mixed with a combustible—such as coal-dust, peat, wood, or other wastes—or with fragments or dust of mineral and chemical substances, such as form the residues of ores, oxids, sulfids, earths, and the like, either alone or mixed with the combustibles. The proportion of the agglomerating mass varies from ten to thirty kilograms per one hundred kilograms of other materials. This proportion may be up to fifty per cent. of the agglomerate for certain ores, these agglomerates of ores being treated directly in a blast-furnace without the addition of combustible or flux. The agglomerated mass after coming out of the mixer and kneader is compressed into small bricks or blocks in a suitable press.

The compound of lime and soda may be considered a mechanical mixture; but the action thereof on organic materials differs from that produced by lime and that produced by soda when these substances are employed separately. The alkaline action of caustic soda, which has the greater energy, increases the like action of the lime. The alkaline action of both substances mixed together is increased by ozone, generated by electric discharges on the surrounding air. Thus I obtain a superoxidized alkaline substance of still greater energy than soda-lime, which is a compound of lime and caustic soda. If atmospheric air were employed for producing the ozone, the action would require a long time by reason of the quantity of oxygen contained in the atmosphere. In practice I employ an apparatus the function of which is to separate the gas from the atmosphere, and thus act on nearly the whole quantity of oxygen separated from the other gases. The apparatus does not form a part of my invention; but it is combined with other arrangements to produce ozone. The soda-lime thus converted has more energetic action on fatty substances—such as oil, tar, &c.—and produces their saponification more readily and completely.

Having described my invention, what I claim as new, and desire to obtain by Letters Patent, is—

The process of manufacturing fuel, consisting of mixing gas-tar with a compound of lime and caustic soda, and with organic acids in the form of fat, the lime-soda compound having first been ozonized, heating and agitating said mixture, and when cool, mixing same with a suitable combustible waste material such as coal-dust or fragments of mineral and chemical substances such as form the residues of ores, oxids, sulfids, pressing same into blocks, substantially as set forth.

ALBERT DILLON DE MICHEROUX.

Witnesses:
AD. STURM,
GREGORY PHELAN.